March 31, 1925. 1,531,440
S. T. HOYT
APPARATUS FOR HANDLING AND TRANSPORTING FRUIT AND THE LIKE
Filed Oct. 21, 1924 3 Sheets-Sheet 2
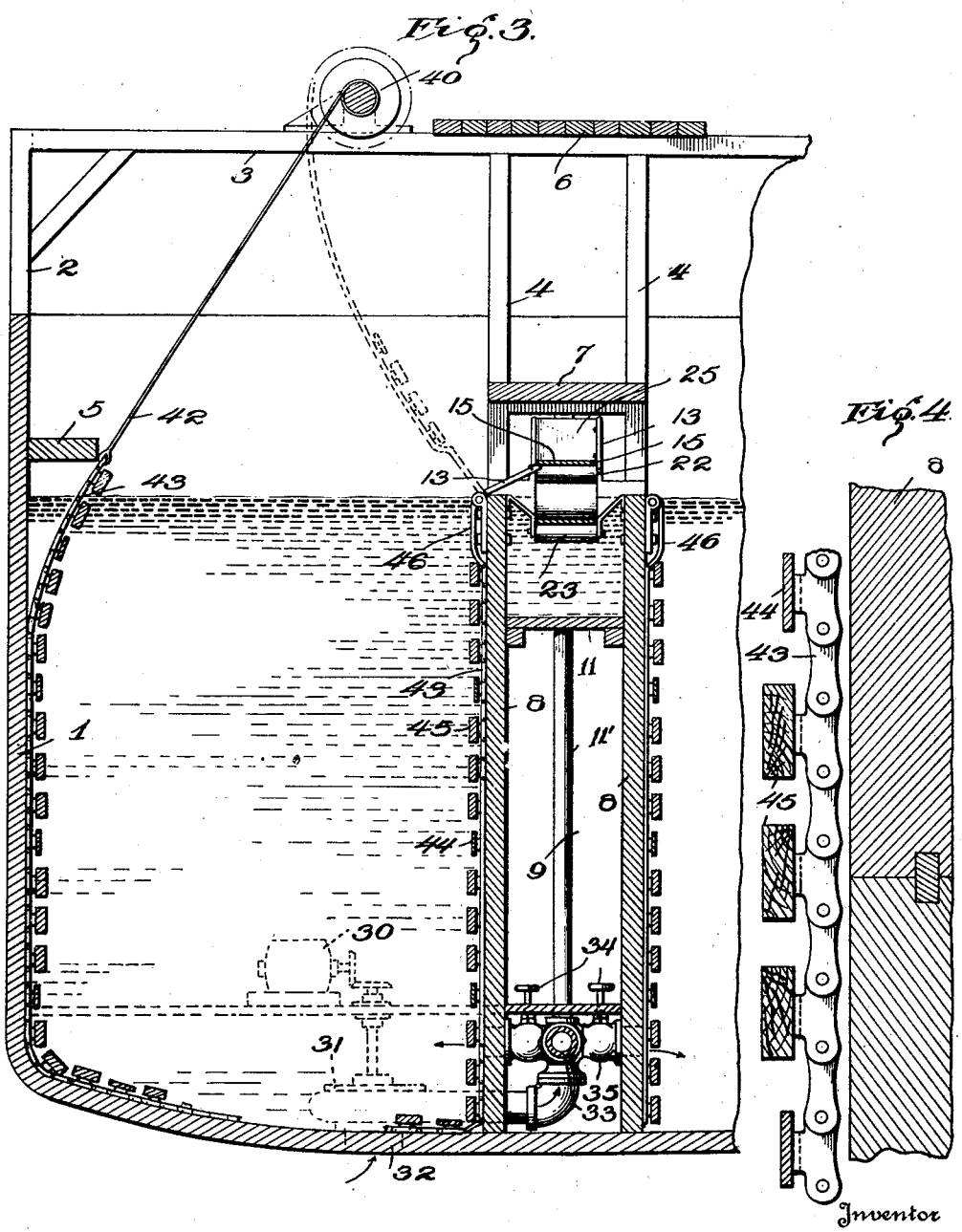
Inventor
Simes T. Hoyt
By O'Neill & Bunn
Attorneys March 31, 1925. 1,531,440
S. T. HOYT
APPARATUS FOR HANDLING AND TRANSPORTING FRUIT AND THE LIKE
Filed Oct. 21, 1924 3 Sheets-Sheet 3
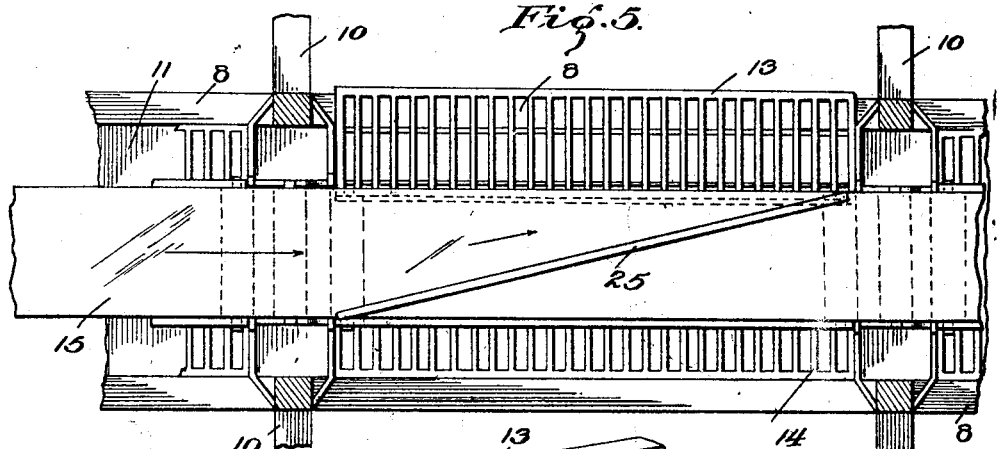
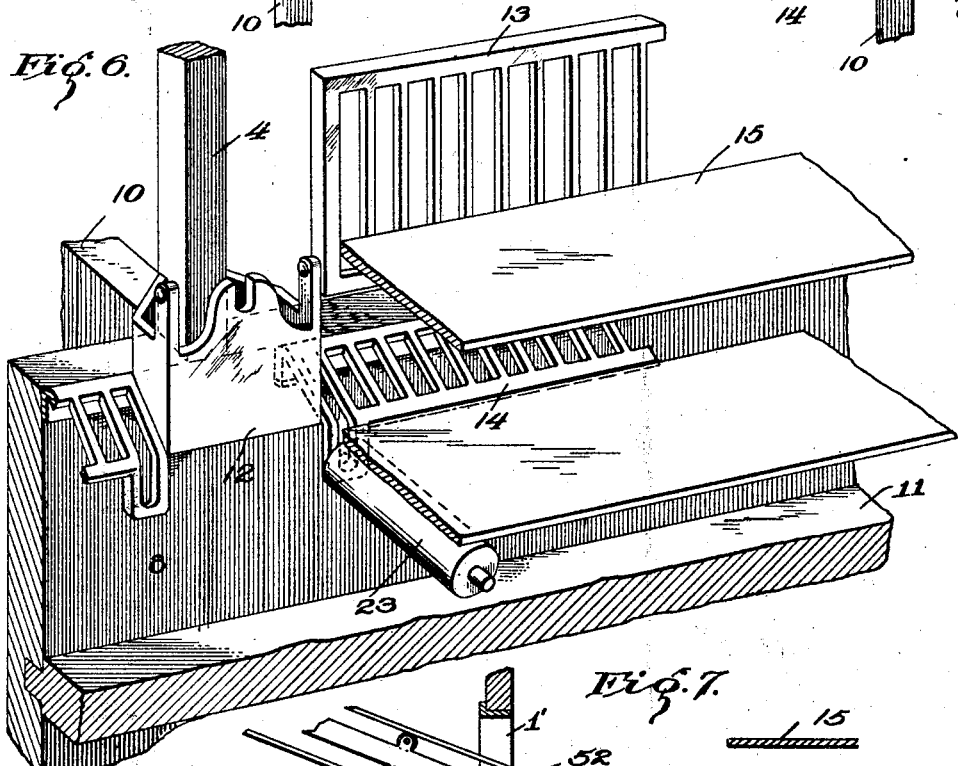
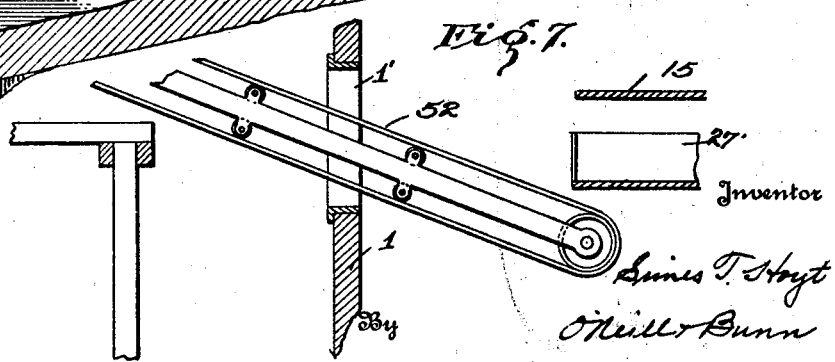

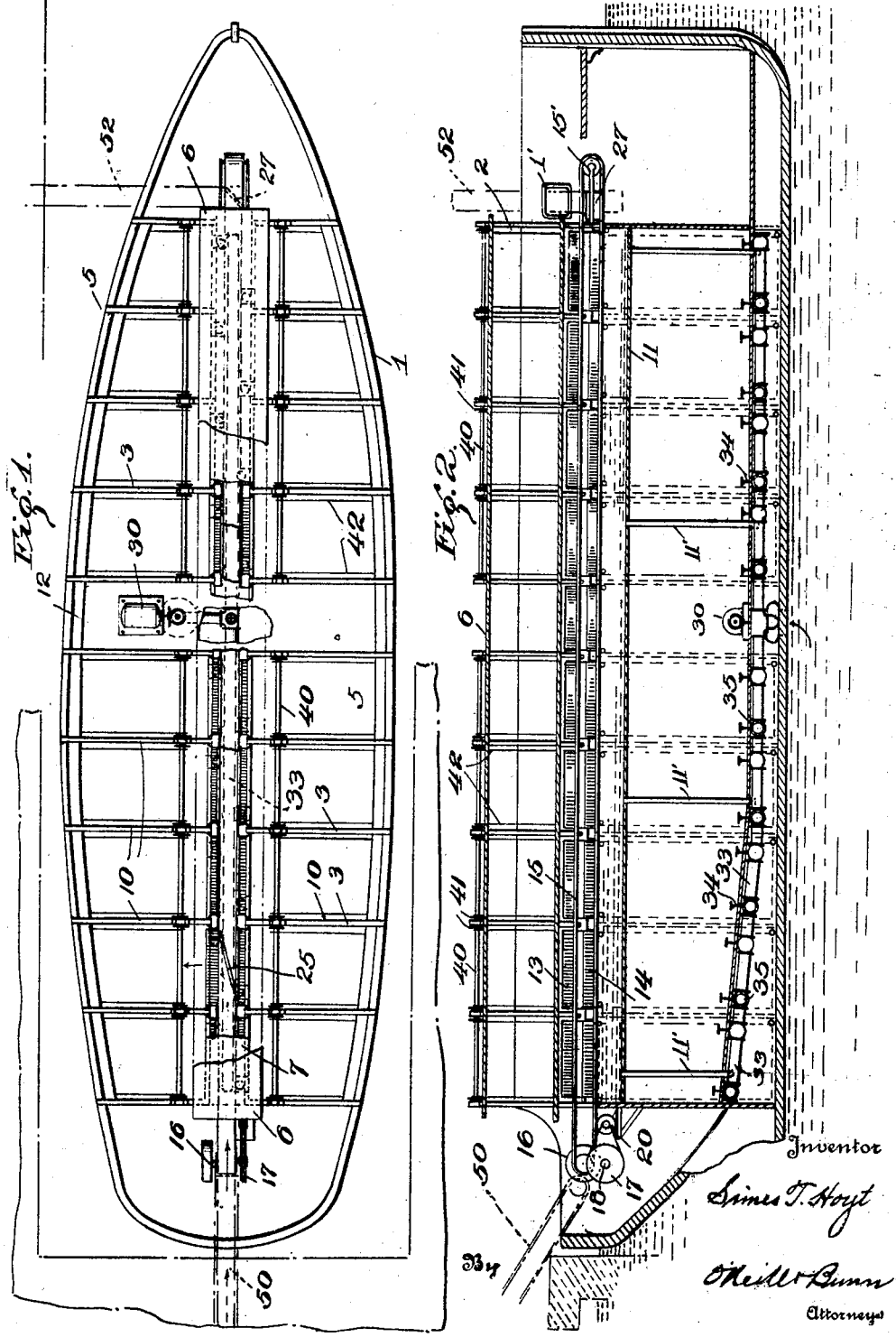

Patented Mar. 31, 1925.

1,531,440

UNITED STATES PATENT OFFICE.

SIMES T. HOYT, OF HONOLULU, TERRITORY OF HAWAII, ASSIGNOR TO HAWAIIAN PINEAPPLE COMPANY, LIMITED, OF HONOLULU, TERRITORY OF HAWAII, A CORPORATION OF THE TERRITORY OF HAWAII.

APPARATUS FOR HANDLING AND TRANSPORTING FRUIT AND THE LIKE.

Application filed October 21, 1924. Serial No. 744,996.

*To all whom it may concern:*

Be it known that I, SIMES T. HOYT, a citizen of the United States, residing at Honolulu, in the Territory of Hawaii, have invented certain new and useful Improvements in Apparatus for Handling and Transporting Fruit and the like; and I do hereby declare the following to be a full, clear, and exact description of the invention, such as will enable others skilled in the art to which it appertains to make and use the same.

The invention relates to certain new and useful improvements in cargo vessels for handling and transporting fruit and the like, of the same general type as disclosed in my companion application Serial No. 652,140, filed July 17, 1923, in which the fruit or other articles are charged into bodies of water contained in separate holds in the vessel, the articles displacing any equivalent body of water from the compartments until the latter are filled with the articles and the water of flotation or submergence, the unloading being effected by supplying additional quantities of water to the individual holds to carry the floatable articles out of the holds and discharge the same from the vessel by way of flumes or conduits. The instant invention involves the same general principles of construction and operation, with the important difference that the loading or charging of the individual holds is effected by a mechanical conveyor located approximately at the upper edge or edges of the bulk heads forming the holds, the upper and lower reaches of the conveyor being so disposed that the charging of the articles into the holds is effected by the upper reach, and the articles are discharged from the holds onto the lower reach of the conveyor by supplying additional water to the individual holds, and, under certain circumstances, providing the individual holds with slings or equivalent elevating devices which lift the submerged articles up to the top edge of the holds or bulkheads, whence they are discharged onto the lower reach of the conveyor aforesaid.

These and other novel features of the invention will be more particularly set forth in the following specification, predicated on the accompanying drawings, in which:—

Fig. 1 is a plan view of the improved cargo boat.

Fig. 2 is a vertical longitudinal sectional elevation of the same;

Fig. 3 is an enlarged fragmentary cross section;

Fig. 4 is an enlarged fragmentary section, showing the construction of the sling or elevator;

Fig. 5 is a fragmentary plan view, showing the relation of the conveyor and its accessories to the several holds;

Fig. 6 is a fragmentary perspective view; and

Fig. 7 is a fragmentary cross section of the vessel, showing the application of the auxiliary unloading conveyor.

Referring to the drawings, 1 indicates the hull of a cargo vessel, which may be either self-propelled or adapted for towing, said hull being equipped with a superstructure comprising upright stanchions 2 disposed at intervals along the sides, to which are secured transverse beams 3 which are supported amidships by stanchions 4—4. Mounted on the beams 3 and running the length of the superstructure is a deck 6 to give access to the winches for operating the slings or elevators in the several holds, as will be described hereinafter. Supported from the stanchions 4 below the deck 6 and above the conveyor is an inspection deck 7. Extending along the interior of the hull, on each side, is a relatively narrow deck section or gangway 5 which permits access to the contents of the holds for the purpose of clearing the holds of obstructions and insuring a proper discharge of the cargo.

In the preferred form of the invention, the major portion of the hull 1 is divided by longitudinal bulkheads 8—8 which define a central longitudinal passage or gangway 9 and which also constitute the inner walls or bulkheads of two series of holds formed by transverse bulkheads 10, located between the stanchions 4—4 and the sides of the vessel. It will thus be seen that the holds extend in two series longitudinally of the hull, the two series being interrupted by an intermediate hold or compartment 12 which extends transversely of the vessel amidships and is adapted to contain the machinery, such as the pump for flooding the holds, and the engine for driving the vessel, if the latter is self-propelled. The upper edges of the bulkheads 8 are preferably of uniform height and define the maximum water level in the holds. Disposed between the bulkheads 8 and extending the full length of the series of holds is a sub-deck 11, which forms with the upper sections of the bulkhead 8 and the fore and aft bulkheads 10, which extend across the hull, a water-tight trough or flume, which is connected at intervals with suitable drain pipes 11', which may lead either into the bilges or be connected at their lower ends with the main supply pipe for flooding the holds. The purpose of the trough is to receive the water discharged from the several holds during the unloading operation and either permit the excess water to be pumped overboard or to be delivered to the main water supply pipe to effect a continuous circulation through the particular holds being emptied.

Extending longitudinally of the vessel and between the parallel series of holds is a continuous belt or equivalent conveyor 15 engaging rolls 15' and 15" at its respective ends, the upper reach being supported by guide rolls 22 and the lower reach being similarly supported by guide rolls 23 disposed at regular intervals throughout the length of the conveyor. Any suitable means may be provided for operating the conveyor, the driving means preferably comprising a motor 20 located near the stern, which drives the train of reducing gears 16, 17 and 18 disposed between the said motor and the shaft of guide roll 15". The upper reach of the belt conveyor 15 is located a short distance above the upper edges of the bulkheads 8 and, similarly, the lower reach of the conveyor is located below the edges of said bulkheads.

Mounted in suitable brackets 12 or equivalent supports attached to the stanchions 4 are pivoted gates or grids 13 adapted to be swung into upright position parallel with and adjacent the lateral edges of the upper reach of the conveyor 15, and to be swung downwardly to overlie the upper edges of the bulkheads 8 and constitute individual chutes leading from the upper reach of the conveyor into the respective holds, as illustrated in Figs. 3, 5 and 6. Secured to the upper edges of the bulkheads 8 is a series of inclined grids 14, one opposite each hold, the lower edges of said grids lying adjacent the top surface of the lower reach of the conveyor belt 15 and constituting chutes for directing fruit or other articles discharged from the respective holds onto the said lower belt reach. As a matter of convenience, the grids 14 may be provided with depending lugs which constitute bearings for the guide rollers 23 supporting the lower reach of the belt, as illustrated in Fig. 6. The several grids 14 are all fixed in position and are located opposite the corresponding holds and, as indicated, serve to deliver the articles discharged from the respective holds onto the lower reach of the conveyor belt.

Disposed in the amidships hold 12 is a water pumping plant comprising a motor 30, driving a pump 31 which has an outboard connection 32, said pump being connected with a pipe line 33 extending longitudinally of the gangway 9 and connected by valved couplings 34 and pipe sections 35 with the respective holds, so that by opening any one of the valves 34, a corresponding hold may be flooded at will. Obviously, the pumping unit may also be connected directly with the bilges for freeing the latter of accumulated water, in the usual manner.

Each hold is preferably provided with a special form of sling or elevating device to be employed in assisting the discharge of the contents of the hold, when the latter constitute articles which are heavier than water, and, therefore, will not be automatically floated out of the hold when the latter is supplied with excess water from the pump and pipe line, as described. The sling or elevator comprises two parallel chains 43 carrying metal slats 44 and wooden slats 45, attached to lugs on the links of the chains, as particularly illustrated in Figs. 3 and 4, each of the chains being anchored to a hinged plate 46 attached to the upper edges of the bulkheads 8 on the hold side of the latter. Each of the chains 43 has attached to its free end a cable 42, said cables and the attached slings being adapted to be wound upon and let off from individual winches 40, mounted on the cross beams 3 and adjacent the winch deck 6, said winches 40 being operable by any appropriate means, such, for example, as the usual pawl, ratchet and lever mechanism employed for this purpose, the levers being actuated by deck hands on deck 6. Preferably the sling is so constructed that its total weight is a little greater than the water which the sling displaces which effect is produced by the wooden slats 45 which, being lighter than water, tend to support the sling in the water, the weight of the metal slats and the chains being sufficient to overbalance the flotation effects of the wooden slats. By making the individual slings only a little heavier than the displaced water, it will obviously require little power to elevate the slings and the fruit or similar articles in the hold, when said articles are also only a little heavier than the water in which they are submerged, so that two deck hands stationed at the operating mechanisms at the respective ends of the individual winches, can readily wind up the sling of a given hold until the sling occupies the position shown in dotted lines in Fig. 3, causing all of the fruit or other articles in the hold to be discharged over the upper edge of the bulkheads 8 and the corresponding chute 14 onto the lower reach of the conveyor.

In loading the vessel, the fruit may be dumped directly onto the upper reach of the conveyor 15, but preferably the delivery of the fruit is effected by means of a portable conveyor 50 which may be extended outward of the stern onto the wharf or other loading point. In unloading the vessel, a portable conveyor 52 is adapted to be passed through a port 1', one of which is located on each side of the bow, with the lower end of said conveyor 52 extending below the lower reach of the belt conveyor 15, so that the articles delivered by the said lower reach of belt 15 will be received by said conveyor 52 and delivered to the wharf or other point of ultimate discharge.

If found desirable or necessary to protect the fruit or other articles being loaded from damage by contact with the pivoted gates 13, removable sideboards may be secured to the gates, which sideboards will also extend over the openings between the ends of the successive gates 13.

In order to direct the fruit or other articles from the upper reach of the conveyor 15, in the loading operation, into the appropriate hold, a suitable deflector board 25, secured by any appropriate means, is disposed diagonally across the upper reach of the belt 15, as shown in Figs. 1, 3 and 5. Said deflector board may also constitute the sideboard which overlies the corresponding grid 13 and the open spaces between the ends of the grid and the adjacent grids.

In operating the apparatus as described, to load the vessel, the latter is preferably backed into the wharf or other loading station and the several holds substantially filled with water. The conveyor 15 is started and the fruit or other articles to be loaded are delivered onto the upper reach of the conveyor 15 by the portable conveyor 50. The gate 13 opposite the particular hold to be loaded is then lowered to its inclined position, so that it overlies the upper edge of the bulkhead 8 forming the inner wall of the hold, said grid extending from the upper reach of the belt 15 and inclined toward the hold. The deflector board 25 is then placed on edge diagonally across the upper reach of the belt 15 in the position shown in Fig. 5, so that the articles on the forwardly moving upper reach engaging the deflector board, will be forced off of the conveyor belt onto the gate 13, down which they slide into the water in the hold. If the articles are heavier than the water, they will sink slowly therein, displacing a corresponding volume of water which flows over the upper edge of the bulkheads 8 into the flume between the bulkheads, the water escaping from the flume by the down pipes or drains 11' into the bilges or being directly discharged by the pump 31 by way of pipe line 33. If the articles are lighter than the water in the hold, the same general effect will be produced by the gradual accumulation of the articles, the lower strata being gradually submerged as the hold is filled, the mass of the accumulated fruit displacing substantially equal volumes of water from the hold. As the articles gradually settle in the hold, the sling or elevating device therein is correspondingly extended or expanded, so that it lies along the side and bottom of the vessel and the vertical wall of the bulkhead 8 in the position shown in Fig. 3, when the hold has been completely loaded. After the hold has received its complement of the cargo, the grip 13 which has constituted the loading chute from the conveyor to the hold, is swung to upright position and the sideboard, if such is employed, may be placed into position against the grid and extended partly over the space between the ends of the grid and the next adjacent grids. Similar operations are performed for the loading of each of the holds until the entire cargo has been loaded, each of the holds being substantially filled with fruit or other articles to be transported, the greater proportion of the weight of the articles being supported by the water of flotation, thereby eliminating the danger of bruising or otherwise damaging the articles, as explained in the copending application aforesaid. The vessel then proceeds, either under its own power or towed with other like vessels of a fleet to the unloading point. Upon reaching its destination, the cargo boat is secured to the dock or other unloading point and the portable conveyor for effecting the loading operation or, if desired, a separate portable conveyor, such as 52, is passed through one of the ports 1', at the bow of the vessel and the conveyor 15 is driven in an opposite direction to cause the lower reach of the belt 15 to travel continuously from the stern toward the bow. The particular hold to be first unloaded is selected and the valve connecting the lower part of said hold with the water supply pipe 33 is opened and pump 31 started up to pump water from the outside of the vessel through the pipe 33 into the hold aforesaid. The excess water delivered to the hold overflows the upper edge of the bulkhead 8 into the flume and carries with it the fruit or other articles which tend to float over the edge of the bulkhead and the grid 14 onto the lower reach of the conveyor belt 15 until said articles engage the deflector board 27 placed diagonally across the lower reach of said belt adjacent the inboard end of portable conveyor 50, said deflector board forcing the fruit off the conveyor 15 onto conveyor 52, which latter delivers the fruit to the point of ultimate discharge of the vessel. If the fruit or other articles stored in the hold are heavier than the water of submergence, so that it is not possible to discharge all of the articles by the current of water set up by the pump and flowing upwardly through the hold, the discharging of the articles from the hold is effected by means of the sling or elevating device, which latter is operated by deck hands actuating the corresponding winch 40 from winch deck 60, gradually winding the major portion of the sling onto the barrel or shaft of the winch until the slatted sling occupies the relation shown in Fig. 3, when all of the artcles will have been lifted out of the hold and slid over the inclined grid 14 onto the lower reach of the conveyor belt 15. After all of the articles have been discharged from the selected hold, the valve connecting said hold with the pipe line 33, is closed and another hold to be discharged of its cargo is selected and the corresponding valve 33 is opened and the same sequence of operations is effected until all of the holds have been similarly discharged of their complements of the cargo. Obviously, instead of effecting the discharge of the several holds at the forward or bow end of the vessel, such discharge may be made through ports located adjacent the stern of the vessel, through which ports the portable conveyor for delivering the articles from the vessel to the shore or to another vessel, is properly positioned. Under these circumstances, the direction of movement of the conveyor belt 15 will not be reversed, for the reason that the lower reach of the conveyor belt normally travels from the bow toward the stern.

It will be understood that the particular structure, form and arrangement of the apparatus, as described, is merely exemplary and is susceptible of various changes without departing from the essential novelty of the invention.

What I claim is:

1. Means for handling and transporting fruit and the like comprising a cargo vessel divided into holds, each containing a body of water, a conveyor extending along the upper edges of the hold forming bulkheads, pivoted gates normally forming sideboards for the conveyor aforesaid and when lowered forming chutes from the conveyor to the corresponding holds, means for driving the conveyor, and means for supplying additional water to the individual holds for discharging the articles therefrom over the edges of the bulkheads onto said conveyor.

2. Means for handling and transporting fruit and the like comprising a cargo vessel divided into holds each containing a body of water, a belt conveyor extending along the upper edges of the hold forming bulkheads, pivoted gates normally forming sideboards for the upper reach of the belt conveyor and when lowered, forming chutes from the conveyor to the corresponding holds, fixed chutes adjacent the upper edges of the bulkheads aforesaid for delivering articles from the respective holds onto the lower reach of the conveyor, means for driving the conveyor, and means for supplying additional water to the individual holds for discharging the articles therein over the edges of the bulkheads and onto the lower reach of the conveyor.

3. Means for handling and transporting fruit and the like comprising a cargo vessel divided into holds each containing a body of water, a belt conveyor extending along the upper edges of the hold forming bulkheads, pivoted gates normally forming sideboards for the upper reach of the belt conveyor and when lowered, forming chutes from the conveyor to the corresponding holds, fixed chutes adjacent the upper edges of the bulkheads aforesaid for delivering articles from the respective holds onto the lower reach of the conveyor, means for driving the conveyor, means for diverting the articles from the conveyor into a selected hold, and means for supplying additional water to the individual holds for discharging the articles therein over the edges of the bulkheads and onto the lower reach of the conveyor.

4. Means for handling and transporting fruit and the like comprising a cargo vessel divided into holds each containing a body of water, a belt conveyor extending along the upper edges of the hold forming bulkheads, pivoted gates normally forming sideboards for the upper reach of the belt conveyor and when lowered forming chutes from the conveyor to the corresponding holds, fixed chutes adjacent the upper edges of the bulkheads aforesaid for delivering articles from the respective holds onto the lower reach of the conveyor, means for driving the conveyor, portable conveyor means for delivering the articles to the upper reach of the conveyor and for receiving articles from the lower reach of the conveyor, and means for supplying additional water to the individual holds for discharging the articles therein over the edges of the bulkheads and onto the lower reach of the conveyor.

5. Means for handling and transporting fruit and the like comprising a cargo vessel divided into longitudinal sets of holds each containing a body of water, a runway between the sets, a belt conveyor operating in said runway having its upper reach above the top edges of the inner longitudinal bulkheads of said holds and its lower reach below said edges, pivoted gates normally serving as sideboards for the upper reach and adapted to be swung downwardly and laterally to form chutes for directing the articles from the upper reach into the corresponding holds, fixed chutes leading from said edges of the bulkheads to the lower reach of the conveyor, portable conveyor means for delivering the articles to the upper reach of the conveyor and for receiving articles from the lower reach of the conveyor, a removable reflector adapted to direct articles from the belt conveyor through any open gate into the corresponding hold, and means for supplying water to the individual holds to float the articles therefrom onto the lower reach of the conveyor.

6. A cargo vessel having a series of holds, a belt conveyor operating along the upper edges of the hold forming bulkheads, means for deflecting articles from said conveyor into the individual holds, a flexible sling in each hold adapted to overlie the sides and bottom of the hold and secured at one end along the upper edge of the bulkhead adjacent the conveyor, and means for withdrawing the free ends of the slings from the respective holds to lift the articles from said holds and discharge said articles onto said conveyor.

7. A cargo vessel having a series of holds, a belt conveyor operating along the upper edges of the hold forming bulkheads, means for deflecting articles from said conveyor into the individual holds, a flexible sling in each hold adapted to overlie the sides and bottom of the hold and secured at one end along the upper edge of the bulkhead adjacent the conveyor, and winches for winding the free ends of the slings to lift the articles from the hold and discharge said articles onto said conveyor.

8. A cargo vessel having a series of holds each containing a body of water, a belt conveyor operating along the upper edges of the hold forming bulkheads, means for deflecting articles from said conveyor into the individual holes, a flexible sling in each hold adapted to overlie the sides and bottom of the hold and secured at one end along the upper edge of the bulkhead adjacent the conveyor, means for withdrawing the free ends of the slings from the respective holds to lift the articles from said holds and discharge said articles onto said conveyor, and means for supplying additional water to the individual holds to discharge the floatable articles therefrom onto the conveyor.

In testimony whereof I affix my signature.

SIMES T. HOYT.